United States Patent
Hermsmeyer et al.

(10) Patent No.: US 8,483,241 B2
(45) Date of Patent: Jul. 9, 2013

(54) METHOD AND APPARATUS FOR MONITORING VIRTUAL CONCATENATION GROUP PERFORMANCE

(75) Inventors: Christian Hermsmeyer, Eckental (DE); Angel Molina, Erlangen (DE); Wolfgang Thomas, Nuremberg (DE)

(73) Assignee: Alcatel Lucent, Paris (FR)

( * ) Notice: Subject to any disclaimer, the term of this patent is extended or adjusted under 35 U.S.C. 154(b) by 1388 days.

(21) Appl. No.: 11/675,181

(22) Filed: Feb. 15, 2007

(65) Prior Publication Data

US 2008/0201105 A1   Aug. 21, 2008

(51) Int. Cl.
    H04J 3/06    (2006.01)
    H04J 3/24    (2006.01)
    H04J 1/16    (2006.01)
    H04J 3/14    (2006.01)

(52) U.S. Cl.
    USPC ............................. 370/503; 370/250; 370/469

(58) Field of Classification Search
    USPC .................................................. 370/503, 469
    See application file for complete search history.

(56) References Cited

U.S. PATENT DOCUMENTS

| 2001/0043603 A1* | 11/2001 | Yu ................................. 370/393 |
| 2002/0176432 A1* | 11/2002 | Courtney et al. ............. 370/415 |
| 2005/0047419 A1* | 3/2005 | Green ...................... 370/395.51 |
| 2005/0053009 A1* | 3/2005 | Denby et al. ................. 370/250 |
| 2005/0063396 A1* | 3/2005 | Yu ................................. 370/401 |
| 2006/0187715 A1* | 8/2006 | Narvaez et al. .......... 365/185.24 |

FOREIGN PATENT DOCUMENTS

| EP | 1 091 513 A | 4/2001 |
| EP | 1 261 157 A | 11/2002 |

OTHER PUBLICATIONS

PCT Search Report and Written Opinion corresponding PCT/US2008/001940, dated Jun. 30, 2008, Lucent Technologies Inc., Applicant.
Characteristics of transport equipment—Description methodology and generic functionality; G.806 (Mar. 2006) ITU-T Standard Pre-Published (P), International Telecommunication Union, Geneva, CH, No. G.806 (Mar. 2006), Mar. 29, 2006, XP017404632.

* cited by examiner

*Primary Examiner* — Michael Thier
*Assistant Examiner* — Brian Cox
(74) *Attorney, Agent, or Firm* — Wall & Tong LLP

(57) ABSTRACT

The invention includes a method and apparatus for determining the performance of a virtual concatenation group (VCG) signal transporting a client signal over a transport network. A method includes collecting a plurality of performance monitoring indicators associated with a plurality of VCG member signals of the VCG signal, synchronizing the performance monitoring indicators with respect to each other, combining the synchronized performance monitoring indicators to form VCG-level performance monitoring indicators, calculating VCG-level performance monitoring primitive measurements based on the VCG-level performance monitoring indicators, and processing the VCG-level performance monitoring primitive measurements to determine VCG performance.

15 Claims, 4 Drawing Sheets

METHOD AND APPARATUS FOR MONITORING VIRTUAL CONCATENATION GROUP PERFORMANCE

FIELD OF THE INVENTION

The invention relates to the field of communication networks and, more specifically, to performance monitoring in transport networks using virtual concatenation.

BACKGROUND OF THE INVENTION

The basic function of transport networks is transparent transport of client signals. A client signal may be transported within a transport network using transport containers. If the size (i.e., bit rate) of a client signal does not match the size of transport containers of the transport network, direct mapping of one client signal into one transport container in not a bandwidth-efficient solution. A typical solution is inverse multiplexing. At the ingress point of the transport network, a client signal is divided into multiple sub-signals where each sub-signal has a size close to the size of the transport container and is mapped into one transport container. At the egress point of the transport network, the sub-signals are extracted from the transport containers and the client signal is reconstructed from the sub-signals. The bandwidth efficiency is achieved by using sub-signals as close as possible in size to the transport containers, thereby minimizing unused bandwidth in the transport network.

For common transport networks (i.e., Synchronous Optical Networks (SONET), Synchronous Digital Hierarchy (SDH) networks, Optical Transport Networks (OTNs), and the like), an inverse multiplexing scheme known as virtual concatenation (VCAT) is used to transport client signals across the transport network in a bandwidth-efficient manner. The VCAT scheme is standardized by the International Telecommunications Union-Telecommunications (ITU-T). In VCAT, for each client signal to be transported across the transport network, the number of transport containers to be used to transport the client signal across the transport network is specified, and the client signal is divided into sub-signals by byte-stripping across the transport containers available for that client signal. In VCAT, the set of transport containers used to transport a client signal is a virtual concatenation group (VCG) having multiple VCG members (i.e., transport containers).

With respect to transmission quality, since a VCG signal has one-to-one correspondence with a client signal transported therein, transmission quality of the client signal may be assessed using transmission quality of the VCG signal. The existing VCAT standards imply monitoring individual VCG member signals of a VCG signal in order to assess the transmission quality provided to the client signal transported by that VCG signal; however, this requires establishing and managing a performance monitoring point for each VCG member signal in a VCG signal, for each VCG signal in the transport network. Disadvantageously, monitoring individual VCG member signals of VCG signals is costly in terms of both network resources (including network element resources and network management resources) and operational expenses (since each performance monitoring point must be managed individually).

Furthermore, in existing transport network equipment, each port unit typically includes anywhere from two to sixty-four VCGs, where each VCG includes between sixty-three and two hundred and fifty-six VCG members. Since existing transport network equipment typically includes between eight and thirty-two such port units, existing transport network equipment typically supports in excess of two thousand VCGs and several tens to hundreds of thousands of associated VCG members. Moreover, as technology advances between equipment generations, the numbers of port units, VCGs, and VCG members supported by transport network equipment continues to grow. This rapid growth of VCG capacity further exacerbates problems associated with transmission quality monitoring.

SUMMARY OF THE INVENTION

Various deficiencies in the prior art are addressed through the invention of a method and apparatus for determining the performance of a virtual concatenation group (VCG) signal transporting a client signal over a transport network. A method includes collecting a plurality of performance monitoring indicators associated with a plurality of VCG member signals of the VCG signal, synchronizing the performance monitoring indicators with respect to each other, combining the synchronized performance monitoring indicators to form VCG-level performance monitoring indicators, calculating VCG-level performance monitoring primitive measurements based on the VCG-level performance monitoring indicators, and processing the VCG-level performance monitoring primitive measurements to determine VCG performance.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention enables performance monitoring of client signals in transport networks using virtual concatenation (VCAT). The transmission quality of a client signal is monitored by monitoring the performance of a VCG signal by which the client signal is conveyed (rather than monitoring individual VCG member signals of the VCG signal). The performance of a VCG signal is monitored by collecting performance monitoring indicators associated with VCG member signals of the VCG signal, synchronizing the performance monitoring indicators, combining the synchronized performance monitoring indicators to form VCG-level performance monitoring indicators, calculating VCG-level performance monitoring primitive measurements based on the VCG-level performance monitoring indicators, and processing the VCG-level performance monitoring primitive measurements in order to determine VCG performance.

By collecting performance monitoring indicators of VCG member signals of a VCG signal in order to monitor the performance of the VCG signal (rather than performing performance monitoring of each of the individual VCG member signals of the VCG signal) in order to assess the transmission quality provided to the client signal conveyed by the VCG signal, the present invention is more efficient than existing solutions in terms of both network resources (including both network element resources and network management resources) and operational expenses (because individual performance monitoring points are no longer required to monitor the VCG signal). In other words, the present invention enables various types of performance monitoring of client signals in a more efficient and, therefore, less costly manner.

Figure 1:
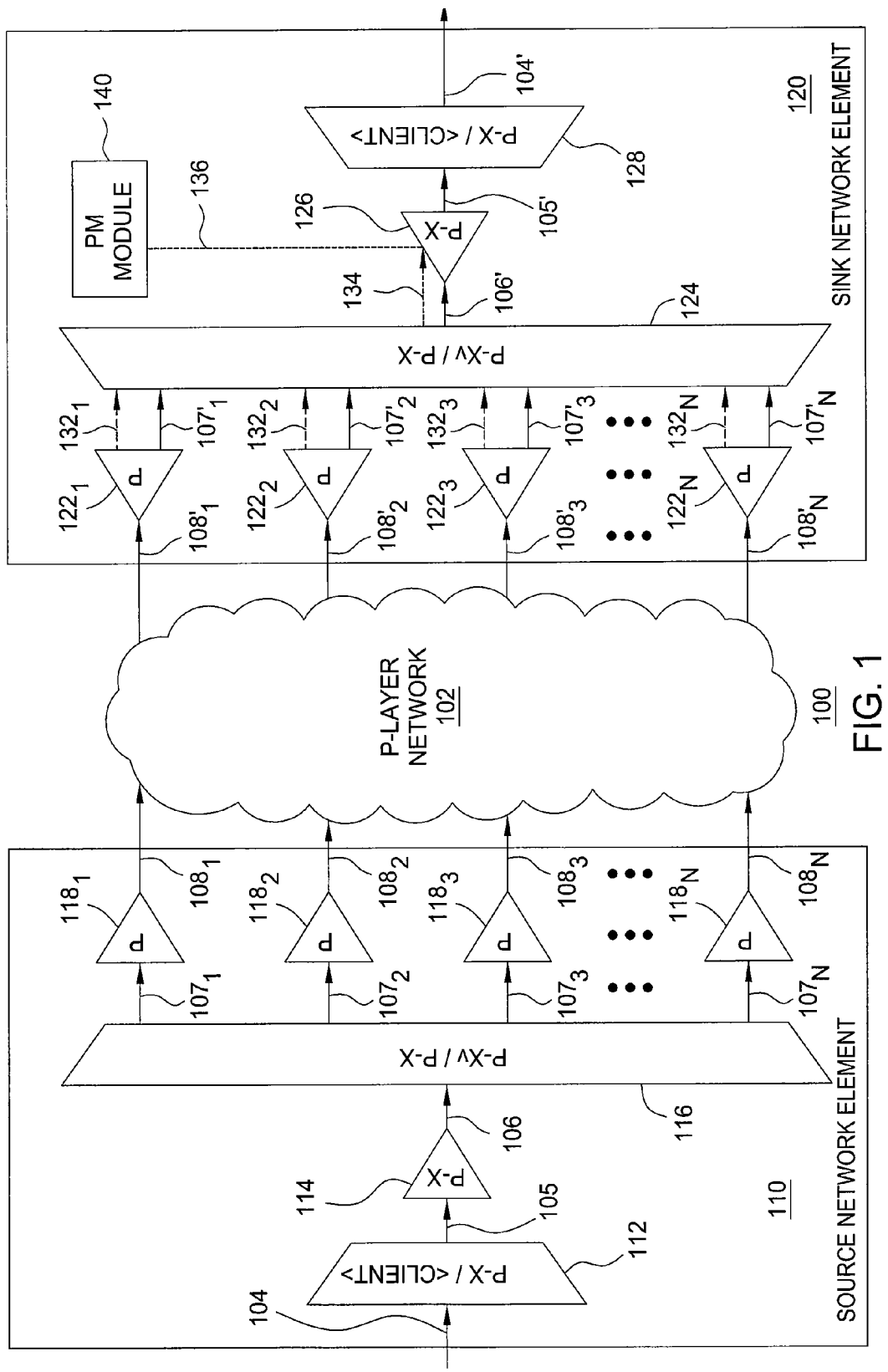
FIG. 1 depicts a high-level block diagram of a communication network (a generic functional model for transport networks using virtual concatenation functions)

FIG. 1 depicts a high-level block diagram of a communication network. The communication network 100 is depicted and described within the context of a generic functional model for transport networks (as specified in ITU-T Standard G.806 (Generic Functional Model for Transport Networks) and related ITU-T Standards such as G.783 (Characteristics of SDH Equipment Functional Blocks), G.798 (Characteristics of OTN Equipment Functional Blocks), and the like, each of which is incorporated by reference herein). The communication network 100 is depicted and described within the context of a generic functional model for transport networks using virtual concatenation (VCAT) functions. In such functional models, trapezoidal shapes represent adaptation functions which convert between signal types (among other processing) and triangular shapes represent termination functions which monitor signals (among other processing).

As depicted in FIG. 1, communication network 100 includes a source network element 110, a P-layer network 102, and a sink network element 120. The P-layer network may be any path-layer network (e.g., STS-N in SONET, VC-N in SDH, OKUk in OTN, and the like, depending on the underling transport technology). The source network element 110 maps a client signal into a VCG signal, decomposes the VCG signal into VCG member signals, and transmits the VCG member signals to sink network element 120 over P-layer network 102. The sink network element 120 receives VCG member signals from source network element 110 over P-layer network 102, reconstructs the VCG signal from the VCG member signals, and extracts the client signal from the VCG signal. The sink network element 120 includes enhanced performance monitoring capabilities.

As depicted in FIG. 1, source network element 110 includes a P-X/<client> adaptation source function 112, a P-X termination source function 114, a P-Xv/P-X adaptation source function 1 16, and a plurality of P termination source functions $118_1$-$118_N$ (collectively, P termination source functions 118). Although primarily depicted and described with respect to ITU-T Standard G.806 (describing a generic functional model for transport equipment), source network element 110 may be implemented in accordance with one or more other technology-specific standards (e.g., ITU-T Standards such as ITU-T G.783 (for SDH), ITU-T G.798 (for OTN), and the like, as well as various combinations thereof). Although omitted for purposes of clarity, source network element 110 may include various processors, memory, circuits, and other components which cooperate to provide the various functions associated with source network element 110, as depicted and described herein.

The P-X/<client> adaptation source function 112 receives a client signal 104. The P-X/<client> adaptation source function 112 may receive client signal 104 from network equipment or a user device. The P-X/<client> adaptation source function 112 maps received client signal 104 into a VCG signal 105. The P-X/<client> adaptation source function 112 provides VCG signal 105 to P-X termination source function 114. The P-X termination source function 114 is intended to add any necessary overhead information in order to monitor the VCG signal (among other processing unrelated to performance monitoring); however, P-X termination source function 114 is currently defined in all standards descriptions not to perform any processing related to performance monitoring. The P-X termination source function 114 provides VCG signal 106 (i.e., a modified verision of VCG signal 105) to P-Xv/P-X adaptation source function 116.

The P-Xv/P-X adaptation source function 116 receives VCG signal 106 from P-X termination source function 114. The P-Xv/P-X adaptation source function 116 decomposes VCG signal 106 into a set of VCG member signals $107_1$-$107_N$ (collectively, VCG member signals 107) associated with VCG signal 106. The P-Xv/P-X adaptation source function 116 provides VCG member signals $107_1$-$107_N$ to P termination source functions $118_1$-$118_N$, respectively. The P termination source functions 118 are intended to add any necessary overhead information in order to monitor VCG member signals 107 (among other processing unrelated to performance monitoring). The P termination source functions 118 transmit VCG member signals 108 (i.e., modified versions of VCG members signals 107, respectively) to sink network element 120 using P-layer network 102.

As depicted in FIG. 1, sink network element 120 includes a plurality of P termination sink functions $122_1$-$122_N$ (collectively, P termination sink functions 122), a P-Xv/P-X adaptation sink function 124, a P-X termination sink function 126, and a P-X/<client> adaptation sink function 128. Although primarily depicted and described with respect to ITU-T Standard G.806 (describing a generic functional model for transport equipment), sink network element 120 may be implemented in accordance with one or more other technology-specific standards (e.g., ITU-T Standards such as G.783 (for SDH), G.798 (for OTN), and the like, as well as various combinations thereof). Although omitted for purposes of clarity, sink network element 120 may include various processors, memory, circuits, and other components which cooperate to provide the various functions associated with sink network element 120, as depicted and described herein.

The P termination sink functions $122_1$-$122_N$ receive VCG member signals $108'_1$-$108'_N$, respectively, from the source network element 110 using P-layer network 102. The P termination sink functions 122 are intended to monitor VCG member signals 108' (among other processing unrelated to performance monitoring). The P termination sink functions 122 provide VCG member signals 107' (i.e., modified versions of VCG member signals 108') to P-Xv/P-X adaptation sink function 124. The P-Xv/P-X adaptation sink function 124 receives VCG member signals 107' from P termination sink functions 122. The P-Xv/P-X adaptation sink function 124 reconstructs VCG signal 106' from VCG member signals 107'.

The P-Xv/P-X adaptation sink function 124 synchronizes VCG member signals 107' (i.e., performing time-alignment of VCG member signals 107' with respect to each other) such that VCG signal 106' is reconstructed from. VCG member signals 107' at sink network element 120 that have time relationships identical to the time relationships that VCG member signals 107 have at source network element 110, thereby compensating for potentially different delays experienced by VCG member signals 108 as VCG member signals 108 traverse P-layer network 102. The P-Xv/P-X adaptation sink function 124 provides VCG signal 106' to P-X termination sink function 126.

The P-X termination sink function 126 receives VCG signal 106' from P-Xv/P-X adaptation sink function 124. The P-X termination sink function 126 is intended to monitor VCG signal 106'; however, P-X termination sink function 126 is currently defined in all standards descriptions not to perform any processing related to performance monitoring. The P-X termination sink function 126 provides VCG signal 105' (i.e., a modified version of VCG signal 106') to P-X/<client> adaptation sink function 128. The P-X/<client> adaptation sink function 128 extracts client signal 104' from VCG signal 105'. The P-X/<client> adaptation sink function 128 transmits extracted client signal 104'. The P-X/<client> adaptation sink function 128 may transmit extracted client signal 104' to network equipment or a user device.

As depicted and described herein with respect to FIG. 1, client signal 104, VCG signal 105, VCG signal 106, VCG member signals 107, and VCG member signals 108 at source network element 110 correspond to client signal 104', VCG signal 105', VCG signal 106', VCG member signals 107', and VCG member signals 108' at sink network element 120, respectively. The "primed" numbers used to identify the signals at the sink network element 120 are intended to reflect that, due to transmission errors (since generally there will be some transmission errors) signals at the sink network element 120 are not exactly the same as the corresponding signals at the source network element 110.

As described herein, sink network element 120 includes enhanced functions adapted for providing improved performance monitoring. The P termination sink functions $122_1$-$122_N$ are enhanced P termination sink functions adapted to collect performance monitoring indicators for VCG member signals $108'_1$-$108'_N$, respectively. The P-Xv/P-X adaptation sink function 124 is an enhanced P-Xv/P-X adaptation sink function 124 adapted to synchronize collected performance monitoring indicators with respect to each other, and to combine the synchronized performance monitoring indicators to form VCG-level performance monitoring indicators. The P-X termination sink function 126 is an enhanced P-X termination sink function adapted to process the VCG-level performance monitoring indicators to form VCG-level performance monitoring primitive measurements for VCG signal 105' (i.e., to calculate the VCG-level performance monitoring primitive measurements using the VCG-level performance monitoring indicators).

As depicted in FIG. 1, P termination sink functions $122_1$-$122_N$ collect pluralities of performance monitoring indicators $132_1$-$132_N$ (collectively, performance monitoring indicators 132) for VCG member signals $108'_1$-$108'_N$, respectively. The P termination sink functions 122 provide performance monitoring indicators 132 to P-Xv/P-X adaptation sink function 124. The P-Xv/P-X adaptation sink function 124 synchronizes collected performance monitoring indicators 132 (i.e., time-aligns collected performance monitoring indicators 132 with respect to each other) and combines the synchronized performance monitoring indicators 132 to form VCG-level performance monitoring indicators 134 for VCG signal 106'. The P-Xv/P-X adaptation sink function 124 provides VCG-level performance monitoring indicators 134 to P-X termination sink function 126. The P-X termination sink function 126 processes VCG-level performance monitoring indicators 134, thereby forming VCG-level performance monitoring primitive measurements 136 for VCG signal 106'.

The sink network element 120 is adapted for performing performance monitoring processing for VCG signal 106' using VCG-level performance monitoring primitive measurements 136 for VCG signal 106'. In one embodiment, at least a portion of the performance monitoring processing using VCG-level performance monitoring primitive measurements 136 is performed by P-X termination sink function 126. In one embodiment, at least a portion of the performance monitoring processing using VCG-level performance monitoring primitive measurements 136 is performed by one or more other components of sink network element 120 (illustratively, performance monitoring module 140). In one embodiment, performance monitoring processing using VCG-level performance monitoring primitive measurements 136 may be standards-compliant performance monitoring processing (e.g., event processing, event binning, event reporting, and the like, as well as other performance monitoring processing).

The source network element adaptation functions and termination functions and sink network element adaptation functions and termination functions depicted and described with respect to FIG. 1 are independent of the underlying transport network technology (i.e., the underlying transport network may be implemented using any transport network technology, such as SONET, SDH, OTN, and the like, as well as various combinations thereof). Although primarily depicted and described with respect to standards such as ITU-T G.806, ITU-T G.783, ITU-T G.798, and the like, the present invention may be implemented using comparable adaptation functions, termination functions, and/or other functions compliant with various other standards, or combinations of standards, in order to provide improved performance monitoring functions.

Furthermore, although the source network element adaptation functions and termination functions and sink network element adaptation functions and termination functions of FIG. 1 are depicted and described as P-X functions (i.e., VCAT functions which can only handle a fixed number of VCG members), the source network element adaptation functions and termination functions and sink network element adaptation functions and termination functions of the present invention may be implemented as P-X-L functions (i.e., LCAS-enabled VCAT functions which can handle a fixed number of VCG members as well as a variable number of VCG members). In other words, the present invention may be implemented in VCAT-based transport networks not utilizing LCAS and VCAT-based networks utilizing LCAS.

Figure 2:
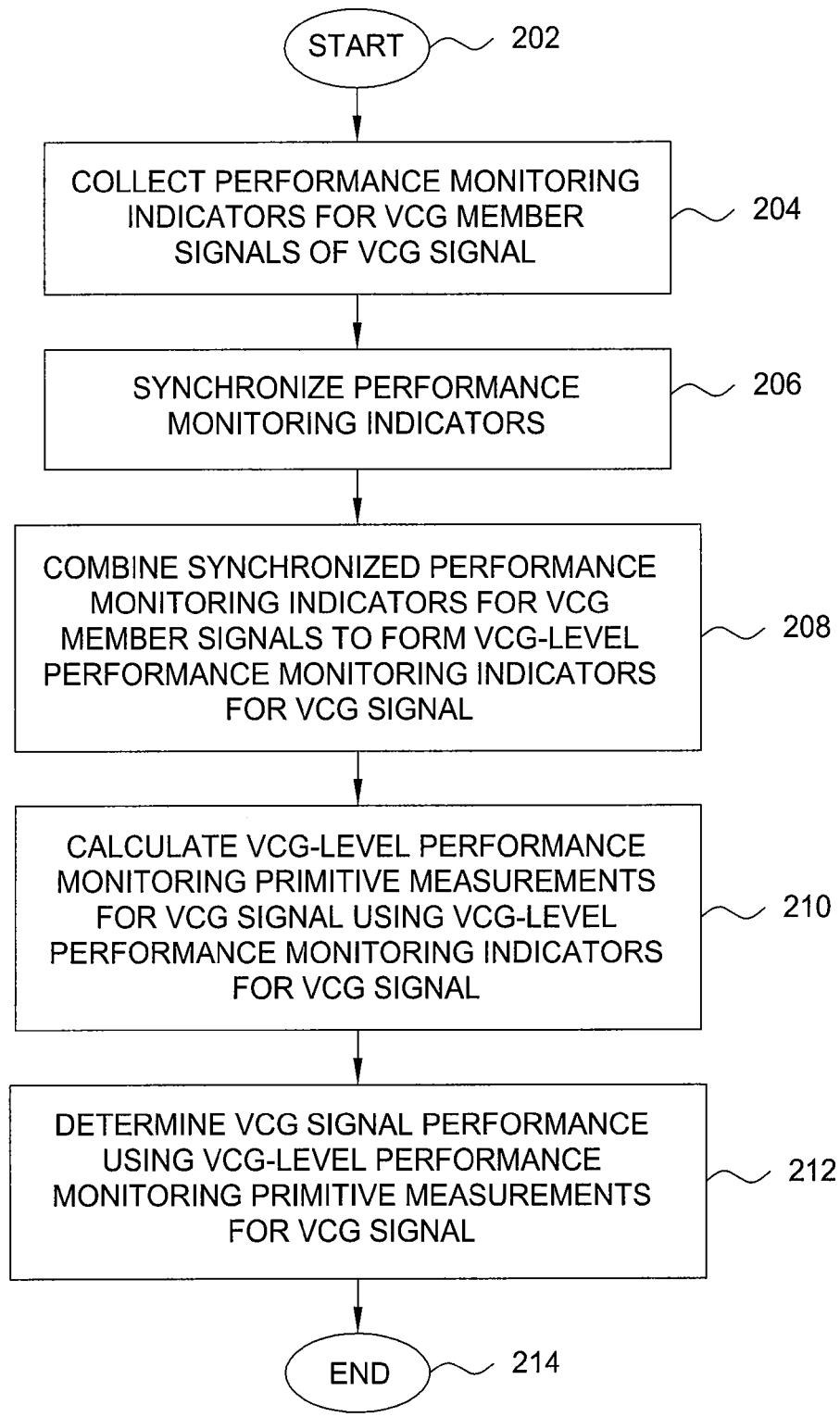
FIG. 2 depicts a method according to one embodiment of the present invention.
Figure 3:
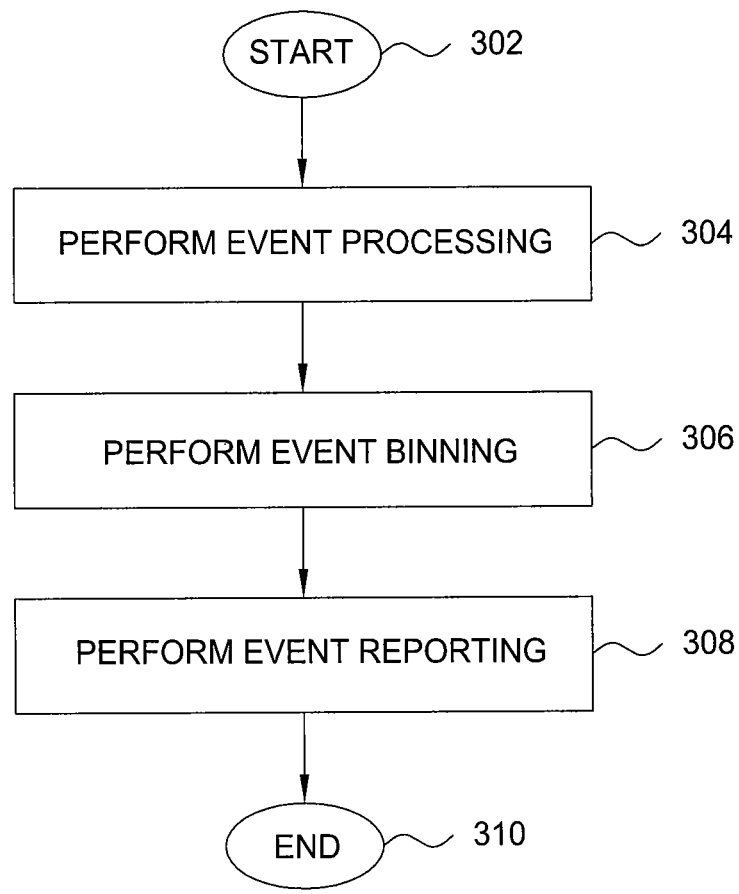
FIG. 3 depicts a method according to one embodiment of the present invention.

The collecting of performance monitoring indicators associated with VCG member signals of a VCG signal, synchronizing of the collected performance monitoring indicators associated with VCG member signals, combining of the synchronized performance monitoring indicators to form VCG-level performance monitoring indicators for the associated VCG signal, calculating of VCG-level performance monitoring primitive measurements using VCG-level performance monitoring indicators, and processing of VCG-level performance monitoring primitive measurements to determine VCG performance for the associated VCG signal may be better understood with respect to FIG. 2, depicted and described herein. The performing of performance monitoring processing for a VCG signal using VCG-level performance monitoring primitive measurements for the VCG signal may be better understood with respect to FIG. 3, depicted and described herein.

FIG. 2 depicts a method according to one embodiment of the present invention. Specifically, method 200 of FIG. 2 includes a method for collecting information adapted for performing performance monitoring processing for a virtual concatenation group signal transporting a client signal over a transport network, where the virtual concatenation group signal transports the client signal using associated virtual concatenation group member signals. Although depicted and described as being performed serially, at least a portion of the steps of method 200 of FIG. 2 may be performed contemporaneously, or in a different order than depicted and described herein with respect to FIG. 2. The method 200 begins at step 202 and proceeds to step 204.

At step 204, performance monitoring indicators are collected. The performance monitoring indicators are collected for each VCG member signal of the VCG signal for which performance monitoring processing shall be performed. At step 206, the collected performance monitoring indicators are synchronized with respect to each other. In one embodiment, the collected performance monitoring indicators are synchronized with respect to each other by time-aligning the collected performance monitoring indicators with respect to each other. At step 208, the synchronized performance monitoring indicators associated with the VCG member signals are combined to form VCG-level performance monitoring indicators for the VCG signal.

The collected performance monitoring indicators may include any performance monitoring indicators. A performance monitoring indicator is a traffic-derived measurement. In one embodiment, performance monitoring indicators are collected in one-frame intervals (although the present invention is not limited to such intervals). The performance monitoring indicators that are collected may vary according to the transport technology (e.g., performance monitoring indicators collected for VCG member signals in a SONET transport network and VCG members in an OTN transport network may be different). The performance monitoring indicators that are collected may vary according to the type of performance monitoring processing to be performed. The performance monitoring indicators that are collected may vary according to other factors or combinations of factors.

For example, basic performance monitoring indicators that may be collected for SONET transport networks include: (1) near-end defect indicator, set to true if the (layer specific) signal fail condition is true at least one time in a given interval; (2) near-end block error mask, the pattern of detected block errors in a given interval; (3) far-end defect indicator, set to true if the RDI defect is true at least once in a given interval; and (4) far-end block error count, the count of reported block errors from the far end in a given interval. Although examples of performance monitoring indicators collected for SONET transport networks have been provided, other performance monitoring indicators may be collected for other transport networks.

In addition to basic performance monitoring indicators collected for common transport networks (e.g., SONET transport networks, SDH transport networks, OTN transport networks, and the like), various other performance monitoring indicators may be collected depending on the transport network (e.g., depending on the standard, layer, functionality, and the like, as well as various combinations thereof). For example, additional performance monitoring indicators may include such indicators as alarm indication signal (AIS) indicators, pointer justification events (PJEs), out-of-frame (OOF) indicators, technology-specific performance monitoring indicators (e.g., Ethernet packets received, Ethernet packets lost, and the like), and the like, as well as various combinations thereof.

In one embodiment, synchronized performance monitoring indicators are combined according to the categories of performance monitoring indicators collected (e.g., near-end defect indicators are combined with near-end defect indicators for all VCG member signals to produce near-end defect indicators associated with the VCG signal, far-end failure counts are combined with far-end failure counts for all VCG member signals to produce far-end failure counts associated with the VCG signal, and so on). In one embodiment, synchronized performance monitoring indicators are combined using combination algorithms that are capable of performing cross-category processing of performance monitoring indicators.

At step 210, VCG-level performance monitoring primitive measurements are calculated. The VCG-level performance monitoring primitive measurements are calculated using the VCG-level performance monitoring indicators. In one embodiment, VCG-level performance monitoring primitive measurements are calculated using procedures analogous to procedures defined in the relevant standards for the VCG member signals, but operating on VCG-level performance monitoring indicators rather than operating on performance monitoring indicators for VCG member signals. In one embodiment, VCG-level performance monitoring primitive measurements are calculated using specific VCG-level procedures.

A performance monitoring primitive measurement is an indicator-based measurement, typically collected in one-second time intervals (although the present invention is not limited to such time intervals). The performance monitoring primitive measurements that are collected (calculated) depend on the performance monitoring indicators that are collected. Similar to performance monitoring indicators, the performance monitoring primitive measurements that are collected may vary according to the transport technology, according to the type of performance monitoring processing to be performed, and the like, as well as various combinations thereof. The performance monitoring indicators that are collected may vary according to other factors or combinations of factors.

For example, basic performance monitoring primitive measurements that may be collected for SONET transport networks include: (1) near-end defect second (pN_DS), set to true if the near-end defect indicator is true at least one time in a given interval; (2) near-end errored block count (pN_EB), the number of block errors detected by the near-end block error mask in a given interval; (3) far-end defect second (pF_DS), set to true if the far-end defect indicator is true at least one time in a given interval; (4) far-end errored block count (pF_EB), the number of reported block error counts in a given interval; (5) near-end failure count, the number of transitions from signal fail defect not present to signal fail defect present; and (6) far-end failure count, the number of transitions from RDI defect not present to RDI defect present. Although examples of performance monitoring primitive measurements collected for a SONET transport network have been provided, other performance monitoring primitive measurements may be collected for other transport networks.

In addition to basic performance monitoring primitive measurements collected for common transport networks (e.g., SONET transport networks, SDH transport networks, OTN transport networks, and the like, various other performance monitoring primitive measurements may be collected depending on the transport network (e.g., depending on the standard, layer, functionality, and the like, as well as various combinations thereof). For example, additional performance monitoring primitive measurements may include alarm indication signal (AIS) seconds (AISS), pointer justification events (PJEs), out-of-frame seconds (OOFSs), severely-errored frame seconds (SEFSs), protection switch count (PSC), protection switch duration (PSD), technology-specific performance monitoring primitive measurements (e.g., Ethernet packets received, Ethernet packets lost, and the like), and the like, as well as various combinations thereof.

At step 212, VCG signal performance is determined using the VCG-level performance monitoring primitive measurements for the VCG signal. The VCG signal performance may be determined by performing performance monitoring processing for the VCG signal using the VCG-level performance monitoring primitive measurements for the VCG-signal. In one embodiment, performing performance monitoring processing includes performing standards-compliant performance monitoring processing, such as performing event processing, event binning, and event reporting for the VCG signal using the VCG-level performance monitoring primitive measurements for the VCG signal. The performing of performance monitoring processing for a VCG signal using VCG-level performance monitoring primitive measurements for the VCG signal may be better understood with respect to FIG. 3. At step 214, method 200 ends.

FIG. 3 depicts a method according to one embodiment of the present invention. Specifically, method 300 of FIG. 3 includes a method for performing performance monitoring processing for a VCG signal using VCG-level performance monitoring primitive measurements. The VCG-level performance monitoring primitive measurements may be calculated according to method 200 of FIG. 2. Although depicted and described as being performed serially, at least a portion of the steps of method 300 of FIG. 3 may be performed contemporaneously, or in a different order than depicted and described with respect to FIG. 3. The method 300 begins at step 302 and proceeds to step 304.

At step 304, event processing is performed for the VCG signal. The event processing is performed using the VCG-level performance monitoring primitive measurements. The event processing generates performance events by correlating the performance monitoring primitive measurements. For example, performance events generated for SONET/SDH transport networks may include: (1) errored seconds (ESs), where a second is categorized as an errored second if (p_DS==true OR p_EB>0); (2) severely errored seconds (SESs), where a second is categorized as a severely errored second if (p_DS==true OR p_EB>SESDT (a threshold)); (3) background block errors (BBEs), where a BBE is equal to p_EB if p_DS==false; and various other performance events.

At step 306, event binning is performed for the VCG signal. The event binning is performed using the generated performance events. The generated performance events are stored as performance parameters. The performance parameters are stored in accumulation registers over a fixed observation window (e.g., 15 minutes, 1 hour, 24 hours, and the like, as well as various combinations thereof). The performance events may be subject to additional filtering before being stored as performance parameters. Depending on network layer, intended application, and various other factors, performance registers may be grouped into a performance monitoring package (where the collection of performance parameter registers, related to a monitoring point (TTP or CTP) and an observation window, is referred to as a bin).

At step 308, event reporting is performed for the VCG signal. An event is reported if a performance monitoring counter associated with a current bin exceeds a provisioned threshold. In one embodiment, a threshold crossing alarm is raised whenever a performance monitoring counter in a bin reaches or exceeds a provisioned threshold, and the threshold crossing alarm is never cleared. In one embodiment, a threshold crossing alarm is raised whenever a performance monitoring counter in a bin reaches or exceeds a provisioned threshold, and the threshold crossing alarm is cleared when the counter is below a provisioned threshold at the end of the accumulation period.

At step 310, method 300 ends. Although depicted and described with respect to performing specific performance monitoring processing for a VCG signal, various other forms of performance monitoring processing may be performed for a VCG signal using the VCG-level performance monitoring primitive measurements for that VCG signal. For example, depending on various factors (e.g., depending on the underlying transport network, network layer, and the like, as well as various combinations thereof), the event processing, event binning, and event reporting functions depicted and described herein may be performed in a different manner than depicted and described in FIG. 3, and, additional performance monitoring processing may be performed (e.g., additional filtering, reporting, and the like, as well as various combinations thereof).

Since the present invention is primarily depicted and described herein with respect to a generic transport network, the present invention is applicable to any transport networks supporting virtual concatenation functions, such as SONET transport networks conveying SONET VCGs, SDH transport networks conveying SDH VCGs, OTN transport networks conveying OTN VCGs, and the like, as well as various combinations thereof. Although primarily depicted and described herein with respect to performing end-to-end VCG performance monitoring, in other embodiments the present invention may be used for performing various other types of VCG performance monitoring. In one such embodiment, for example, the present invention may be used for non-intrusive VCG performance monitoring.

Figure 4:
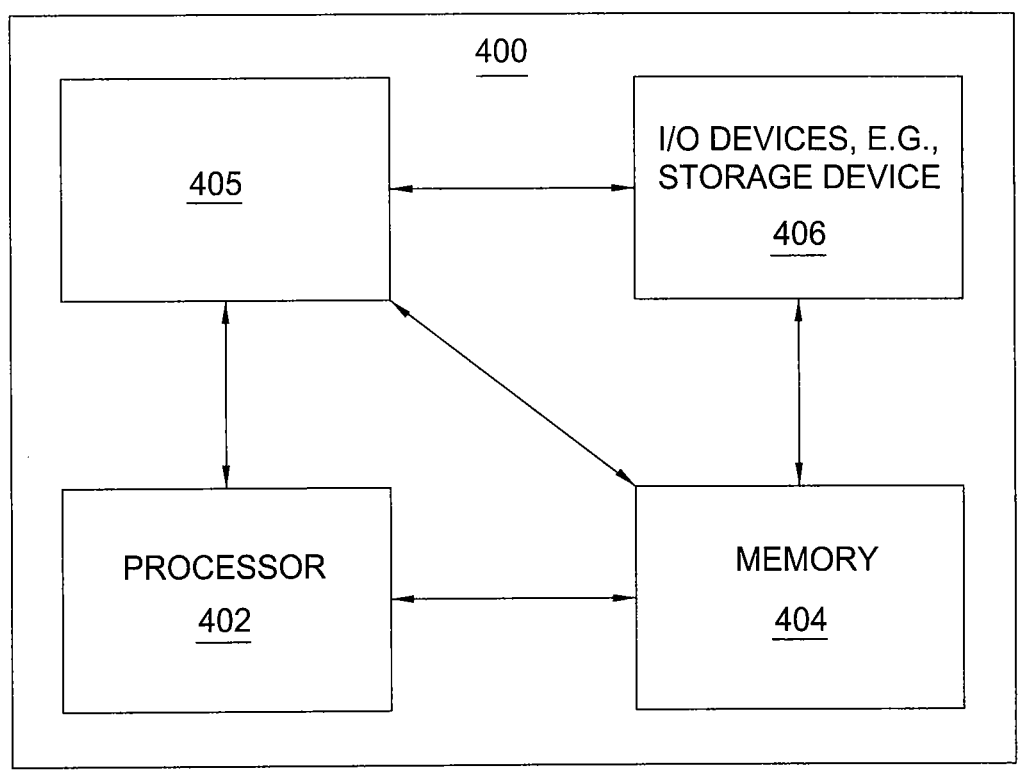
FIG. 4 depicts a high-level block diagram of a general-purpose computer suitable for use in performing the functions described herein.

FIG. 4 depicts a high-level block diagram of a general-purpose computer suitable for use in performing the functions described herein. As depicted in FIG. 4, system 400 comprises a processor element 402 (e.g., a CPU), a memory 404, e.g., random access memory (RAM) and/or read only memory (ROM), a performance monitoring module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present performance monitoring process 405 can be loaded into memory 404 and executed by processor 402 to implement the functions as discussed above. As such, performance monitoring process 405 (including associated data structures) of the present invention can be stored on a computer readable medium or carrier, e.g., RAM memory, magnetic or optical drive or diskette and the like.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for determining the performance of a virtual concatenation group (VCG) signal transporting a client signal over a transport network, the method comprising:
    collecting, for each of a plurality of VCG member signals of the VCG signal, a plurality of performance monitoring indicators associated with the VCG member signal of the VCG signal;
    synchronizing the performance monitoring indicators of the VCG member signals with respect to each other;
    combining the synchronized performance monitoring indicators of the VCG member signals to form VCG-level performance monitoring indicators;
    calculating VCG-level performance monitoring primitive measurements based on the VCG-level performance monitoring indicators; and
    processing the VCG-level performance monitoring primitive measurements to determine VCG performance.

2. The method of claim 1, wherein the performance monitoring indicators of the VCG member signals are collected by a plurality of termination sink functions.

3. The method of claim 1, wherein synchronizing the performance monitoring indicators comprises:
    time-aligning the performance monitoring indicators of the VCG member signals with respect to each other.

4. The method of claim 1, wherein the performance monitoring indicators are synchronized and combined by a signal adaptation function.

5. The method of claim 1, wherein the VCG-level performance monitoring primitive measurements are calculated by a signal termination function.

6. The method of claim 1, wherein processing the VCG-level performance monitoring primitive measurements to determine VCG performance comprises:
    performing performance monitoring processing using the VCG-level performance monitoring primitive measurements.

7. The method of claim 6, wherein performing performance monitoring processing comprises:
    generating performance events using the VCG-level performance monitoring primitive measurements;
    binning the generated performance events; and
    reporting at least one alarm based on the binned performance events.

8. An apparatus for determining the performance of a virtual concatenation group (VCG) signal transporting a client signal over a transport network, comprising:
    a plurality of first functions for collecting, for each of a respective plurality of VCG member signals of the VCG signal, a plurality of performance monitoring indicators associated with the VCG member signal of the VCG signal;
    a second function for synchronizing the performance monitoring indicators of the VCG member signals with respect to each other and combining the synchronized performance monitoring indicators of the VCG member signals to form VCG-level performance monitoring indicators;
    a third function for calculating VCG-level performance monitoring primitive measurements based on the VCG-level performance monitoring indicators; and
    a processing module for processing the VCG-level performance monitoring primitive measurements to determine VCG performance.

9. The apparatus of claim 8, wherein the first functions comprise a plurality of termination sink functions.

10. The apparatus of claim 8, wherein the second function synchronizes the performance monitoring indicators of the VCG member signals by time-aligning the performance monitoring indicators with respect to each other.

11. The apparatus of claim 8, wherein the second function comprises a signal adaptation function.

12. The apparatus of claim 8, wherein the third function comprises a signal termination function.

13. The apparatus of claim 8, wherein the processing module is configured to process the VCG-level performance monitoring primitive measurements by performing performance monitoring processing using the VCG-level performance monitoring primitive measurements.

14. The apparatus of claim 13, wherein the processing module is configured to perform the performance monitoring processing by:
    generating performance events using the VCG-level performance monitoring primitive measurements;
    binning the generated performance events; and
    reporting at least one alarm based on the binned performance events.

15. An apparatus for determining the performance of a virtual concatenation group (VCG) signal transporting a client signal over a transport network, comprising:
    a plurality of termination sink functions configured to collect, for each of a plurality of VCG member signals of the VCG signal, a plurality of performance monitoring indicators associated with the VCG member signal of the VCG signal;
    a signal adaptation function configured to synchronize the performance monitoring indicators of the VCG member signals with respect to each other; and to combine the synchronized performance monitoring indicators of the VCG member signals to form VCG-level performance monitoring indicators;
    a signal termination function configured to calculate VCG-level performance monitoring primitive measurements based on the VCG-level performance monitoring indicators; and
    a processing module configured to process the VCG-level performance monitoring primitive measurements to determine VCG performance.

* * * * *